(12) United States Patent
Goss et al.

(10) Patent No.: US 8,255,617 B2
(45) Date of Patent: Aug. 28, 2012

(54) MAINTAINING DATA INTEGRITY IN A DATA STORAGE DEVICE

(75) Inventors: Ryan James Goss, Lakeville, MN (US); Mark Allen Gaertner, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 374 days.

(21) Appl. No.: 12/693,716

(22) Filed: Jan. 26, 2010

(65) Prior Publication Data

US 2011/0185113 A1    Jul. 28, 2011

(51) Int. Cl.
*G06F 12/16* (2006.01)

(52) U.S. Cl. . 711/103; 711/156; 711/170; 711/E12.008; 711/E12.103

(58) Field of Classification Search .......... None
See application file for complete search history.

(56) References Cited

U.S. PATENT DOCUMENTS

| | | | |
|---|---|---|---|
| 5,761,677 A | 6/1998 | Senator et al. | |
| 6,298,425 B1 | 10/2001 | Whitaker et al. | |
| 6,643,653 B1 | 11/2003 | Chu | |
| 6,751,750 B1 | 6/2004 | Humlicek | |
| 6,880,101 B2 | 4/2005 | Golasky et al. | |
| 6,981,102 B2 | 12/2005 | Beardsley et al. | |
| 7,337,351 B2 | 2/2008 | Zane et al. | |
| 2009/0150599 A1* | 6/2009 | Bennett | 711/103 |
| 2009/0276586 A1* | 11/2009 | Royer et al. | 711/154 |
| 2010/0235565 A1* | 9/2010 | Ton-That et al. | 711/103 |

OTHER PUBLICATIONS

Jesung Kim; Jong Min Kim; Noh, S.H.; Sang Lyul Min; Yookun Cho;, "A space-efficient flash translation layer for CompactFlash systems", Consumer Electronics, IEEE Transactions on, vol. 48, No. 2, pp. 366-375, May 2002.*

* cited by examiner

*Primary Examiner* — Edward Dudek, Jr.
*Assistant Examiner* — Ralph A Verderamo, III
(74) *Attorney, Agent, or Firm* — Hall Estill Attorneys at Law (57) ABSTRACT

Method and apparatus for maintaining data integrity in a data storage device. In accordance with some embodiments, a memory space has a plurality of garbage collection units (GCUs) each arranged to store user data identified by logical addresses. Each GCU has a metadata region that stores metadata that correlates the logical addresses LBAs with physical addresses and a header region that stores descriptor data that identifies LBAs stored in the associated GCU. A control circuit identifies an error in the metadata from the descriptor data of a selected GCU and rebuilds the metadata to indicate a storage location of a most current version of data associated with a selected logical address.

23 Claims, 6 Drawing Sheets

MAINTAINING DATA INTEGRITY IN A DATA STORAGE DEVICE

SUMMARY

Various embodiments of the present invention are generally directed to a method and apparatus for maintaining data integrity in a data storage device.

In accordance with some embodiments, a memory space is arranged to provide a plurality of garbage collection units (GCUs) each adapted to store user data identified by associated logical addresses. Each of the GCUs further store metadata that correlates the logical addresses with physical addresses of the stored user data, and descriptor data that identifies the logical addresses of the user data stored in the associated GCU. A control circuit uses the descriptor data to identify an error in the metadata for a selected GCU, and rebuilds the metadata to correctly indicate a physical address of a most current version of the user data associated with a selected logical address.

These and other features and aspects which characterize the various embodiments of the present invention can be understood in view of the following detailed discussion and the accompanying drawings.

DETAILED DESCRIPTION

The present disclosure relates to data handling systems, and in particular to methods and devices that may be used to maintain data integrity in a data storage device.

Data storage devices generally operate to store blocks of data in memory. The devices can employ data management systems to track the physical locations of the blocks so that the blocks can be subsequently retrieved responsive to a read request for the stored data. Some types of data storage devices, such as solid state drives (SSDs), can be arranged to write data to a new available location each time a block is presented for writing. Over time, a situation may arise where several versions of a given block may persist in memory, with one of the versions being the most current data and the remaining versions being older, stale data.

Metadata can be generated and maintained to track the locations and status of the stored data. Such metadata tracks the relationship between logical elements (such as logical block addresses, LBAs) stored in the memory space and physical locations (such as physical block addresses, PBAs) of the memory space.

Data management systems often extend considerable effort to maintain the metadata in an up-to-date and accurate condition, since the metadata are used to retrieve data responsive to host data requests. Metadata failures can occur from time to time due to a variety of factors, including loss or corruption of the stored metadata, failures in the circuitry used to access the metadata, incomplete updates of the metadata during a power failure, etc. In some cases, a metadata failure may result in an older version of data being returned to the host. In other cases, the failure may render the entire device unusable.

In accordance with exemplary embodiments, the integrity of a memory space can be improved by storing metadata that provides logical-to-physical locality information, as well as separate descriptor data that allows verification of the metadata and, if necessary, reconstruction of the metadata in the event of a failure condition.

In some embodiments, the descriptor data include header data at both a GCU (garbage collection unit) level and at a page level. The descriptor data may further employ a bitmask with status bits that indicate the status (current or stale) of each stored LBA. The descriptor data can be stored in a variety of suitable locations. In this way, a storage device can overcome a potentially catastrophic failure by rebuilding portions of the memory space that provide the most recently written data associated with a particular LBA.

Figure 1:
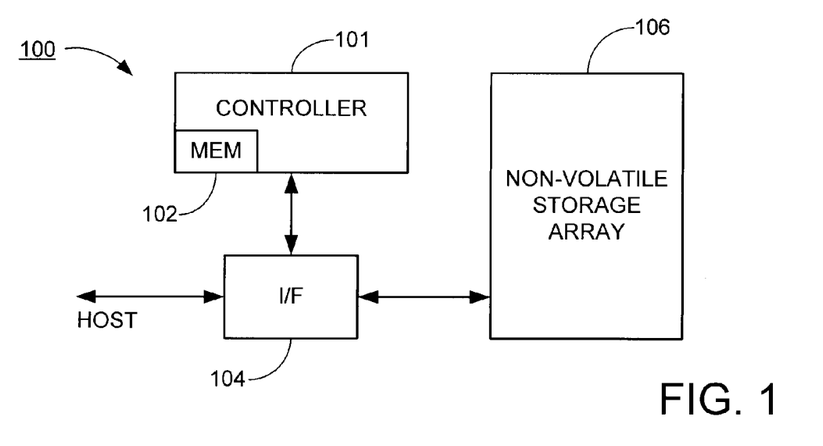
FIG. 1 represents a data storage device constructed and operated in accordance with various embodiments of the present invention.

FIG. 1 shows an exemplary data storage device 100. While not limiting, for purposes of the present discussion the device 100 will be characterized as a solid-state drive (SSD) that utilizes Flash memory to provide non-volatile memory storage.

The device 100 includes a top level controller 102, an interface (I/F) circuit 104 and a non-volatile data storage array 106. The I/F circuit 104 operates under the direction of the controller 102 to transfer user data between the array 106 and a host device (not shown). In some embodiments, the controller 102 is a programmable microcontroller. Data can be buffered in the I/F circuit 104 pending a transfer of the data between the array 106 and the host device. The array 106 can be arranged as one or more planes, layers, chips, etc.

Figure 2A:
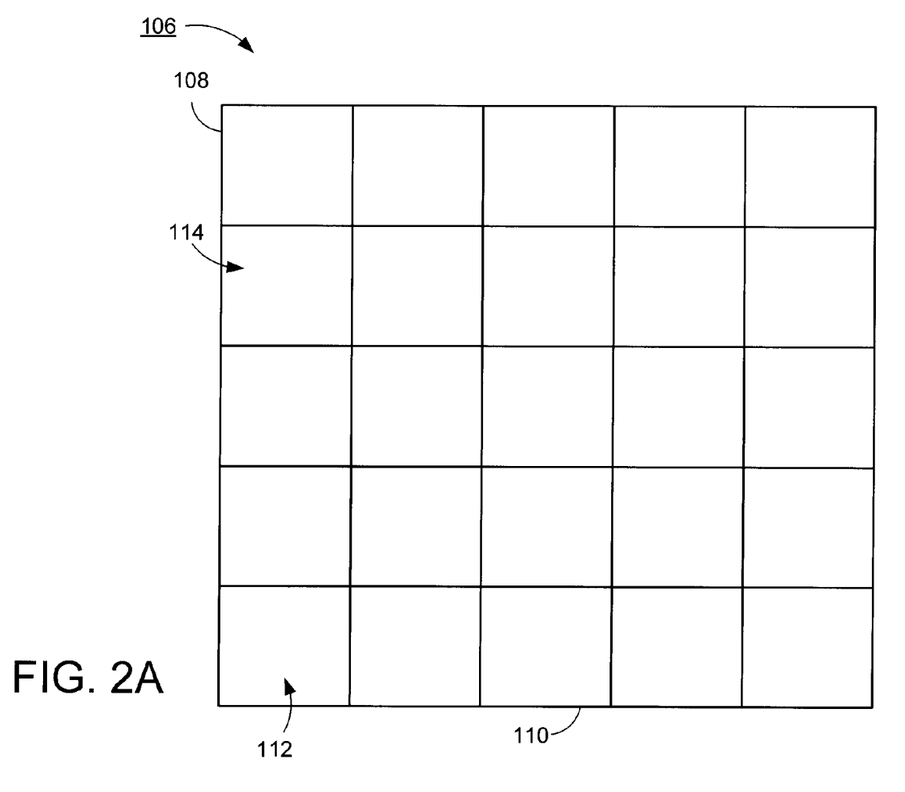
FIGS. 2A and 2B show portions of a memory array of the device of FIG. 1, including the arrangement of memory blocks into garbage collection units (GCUs).

FIG. 2A provides a functional representation of portions of the non-volatile storage array 106 of FIG. 1. Non-volatile memory cells are arranged in rows 108 and columns 110 to define a number of fixed sized memory blocks 112. Each block incorporates multiple pages (e.g., rows) of memory, with each page sharing a common source control line. An exemplary block size is 128 pages of memory with each page providing 4096 bytes (4 KB) of storage. Other block sizes can be used.

The blocks 112 may be erasure blocks, that is, the smallest increment of memory subjected to an erase operation at a given time. Each column 110 in FIG. 2 may represent a different plane, chip, memory layer, etc. so logical proximity in FIG. 2A does not necessarily imply physical proximity.

In some embodiments, data are supplied from the host in fixed size sectors, such as 512 bytes. Each sector may have an associated logical block address (LBA) which allows unique identification of the block at the host level. The blocks of data are stored at an associated physical block address (PBA) in the array. Due to a variety of factors including data compression, encoding, encryption, etc., the actual number of bits stored in the associated PBA in the array may vary from one block (LBA) to the next. Because the LBAs are written sequentially to the next available location, a particular LBA may have a PBA that spans certain boundaries, such as from one page to the next in a given block 112. Metadata are generated and stored to provide the requisite logical-to-physical locality to convert LBA information to the associated PBA information for each LBA stored by the array.

Figure 2B:
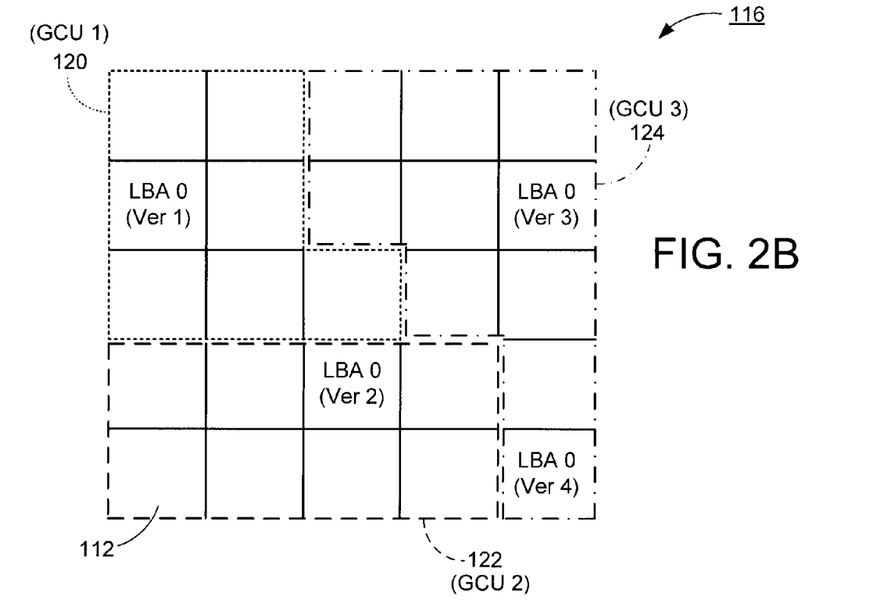

FIG. 2B shows the array 116 of FIG. 2A arranged into a number of manageable regions referred to as garbage collection units (GCUs). The GCUs can be arranged as a single block 112, multiple blocks, or any other suitable grouping of the array. Three exemplary GCUs are shown at 120, 122 and 124 (GCUs 1-3). Each GCU is managed as a unit for writing, reading and erasure operations. The GCUs are allocated in turn to store data from a host. For example, GCU 1 may be allocated first and filled with stored data prior to allocation of GCU 2, and GCU 3 may be allocated once GCU 2 is filled.

While not necessarily required, it is contemplated that new data will be written to the next available page location in the most recently allocated GCU. When the GCUs comprise multiple blocks 112, a separate tracking mechanism can be provided to indicate the internal sequence for filling the individual blocks 112; that is, all 128 pages of data for a first erasure block 112 will be filled prior to writing data to the first page of a second erasure block, etc.

A selected LBA (LBA 0) is shown in FIG. 2B to have been successively stored in different locations of the array. A first version of LBA 0 is stored in GCU 120, a second, updated version is stored in GCU 122, and third and fourth updated versions are stored in GCU 124. Version 4 represents the current version of data and versions 1-3 represent stale data. While under some circumstances it may be appropriate to return an older version of data to the host (such as during a special archive retrieval event), under normal circumstances only the current version of data will be returned responsive to a host read request. Ideally, the metadata associated with the GCUs correctly identifies Version 4 as the most current version.

Figure 3:
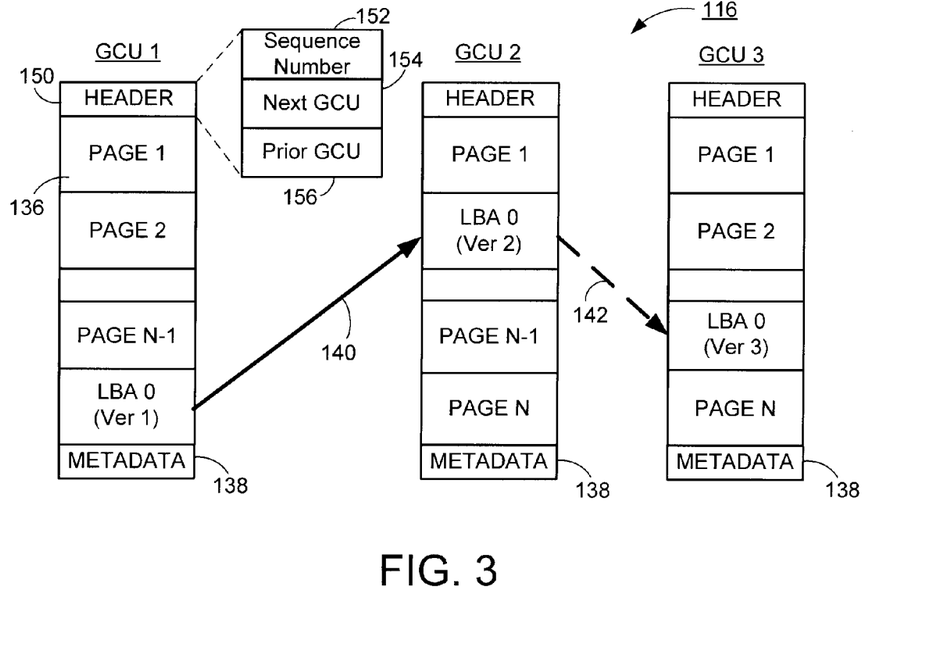
FIG. 3 provides an exemplary format for GCU descriptor data used in accordance with various embodiments.

FIG. 3 generally illustrates a block representation of portions of the memory array 116 of FIGS. 2A-2B. GCUs 1-3 are each provided with a plurality of pages 136 and at least one metadata region 138. The metadata ideally store all the necessary operational information to uniquely locate a physical location for a particular LBA in the associated GCU. Such metadata information can be used to locate various elements including firmware, defects, user data, and system information. A number of metadata formats can be used, including forward pointers that identify the address of a later version of a given LBA.

The metadata can be accessed from the array each time the associated GCU is accessed, or the metadata can be loaded to a volatile memory during system initialization for local access by the controller. While the metadata region 138 is shown to be appended to the end of the GCU, it will be appreciated that the metadata can be stored in any suitable location, including being appended to each page 136 in turn.

In various exemplary embodiments, a data storage device such as 100 of FIG. 1 reads and updates the metadata corresponding to portions of the memory space to correlate assigned LBAs with the actual PBAs. A failure of any kind to the metadata, such as erroneous or missing metadata or an inability to retrieve the metadata due to a physical defect or circuit error, can adversely affect the ability of the device to return previously stored data to the host.

In FIG. 3, a first version of LBA 0 is stored in GCU 1, a second version is stored in GCU 2 and a third, most current version is stored in GCU 3. The metadata is designed to provide forward pointers 140, 142 which direct the system to the physical of the most current version. If a metadata failure results in the inability to properly decode the second forward pointer 142, the system may incorrectly identify the second version in GCU 2 as the most current version and return this data to the host.

Accordingly, various embodiments of the present invention append additional data management information to the system. This management information, referred to herein as descriptor data, operates to enable verification of the metadata from the metadata regions 138. The descriptor data also allows partial or complete reconstruction of the metadata in the event of system loss.

In exemplary embodiments, the descriptor data is provided in the form of headers at both the individual GCU level and at the individual page level. The descriptor data can be alternatively stored in and distributed among any number of other suitable locations depending on the requirements of a given application. In some cases, the descriptor data can advantageously reduce the required size of the metadata.

GCU descriptor data are exemplified in FIG. 3. In at least some embodiments, the GCU descriptor data are generated for each GCU when the GCU is allocated for service. As shown in FIG. 3, a GCU header region 150 stores the GCU descriptor data as a sequence number 152, a next GCU pointer 154, and a prior GCU pointer 156. The sequence number 152 can be a time stamp or other serial number that identifies when the GCU was allocated and began being used to store data. The next GCU pointer 154 identifies the location (physical address) of the next GCU allocated after the current GCU, and the prior GCU pointer 156 identifies the location of the GCU allocated prior to the current GCU.

The GCU descriptor data can be referenced to identify the sequence in which currently active GCUs were allocated for the storage of user data. In the example of FIG. 3, the sequence number field 152 can occupy 32 bits, and the next GCU and prior GCU fields 154, 156 can be provided as 16 bits for a total of 64 bits. These bits can occupy the first row of the GCU, with page 0 occupying the remainder of this row. Other suitable locations can be alternatively used. If multiple GCUs are concurrently available, the GCUs can be arranged into a ready queue and the sequence number will differentiate which GCU was utilized first. Each GCU remains active until filled with stored data, after which a next available GCU is allocated for use.

It will be noted that as each GCU is erased and placed into service, the time stamp data of field 152 and the physical address of the previous GCU of field 154 will be known, and so these values can be written to fields 152, 154 of the newly allocated GCU at this time. The address of the next GCU of field 156, however, may or may not be known at this time.

If the system uses an ordered queue of available GCUs, the next GCU in the queue can be identified as the next GCU and so field 156 can be filled when the current GCU is initially allocated. On the other hand, if GCUs are allocated on an as-needed basis, the next GCU may not be known until the current GCU is filled. Thus, upon allocation of a given GCU, the field 156 may remain blank and will not be filled in until the next GCU is actually allocated and placed into service.

Figure 4:
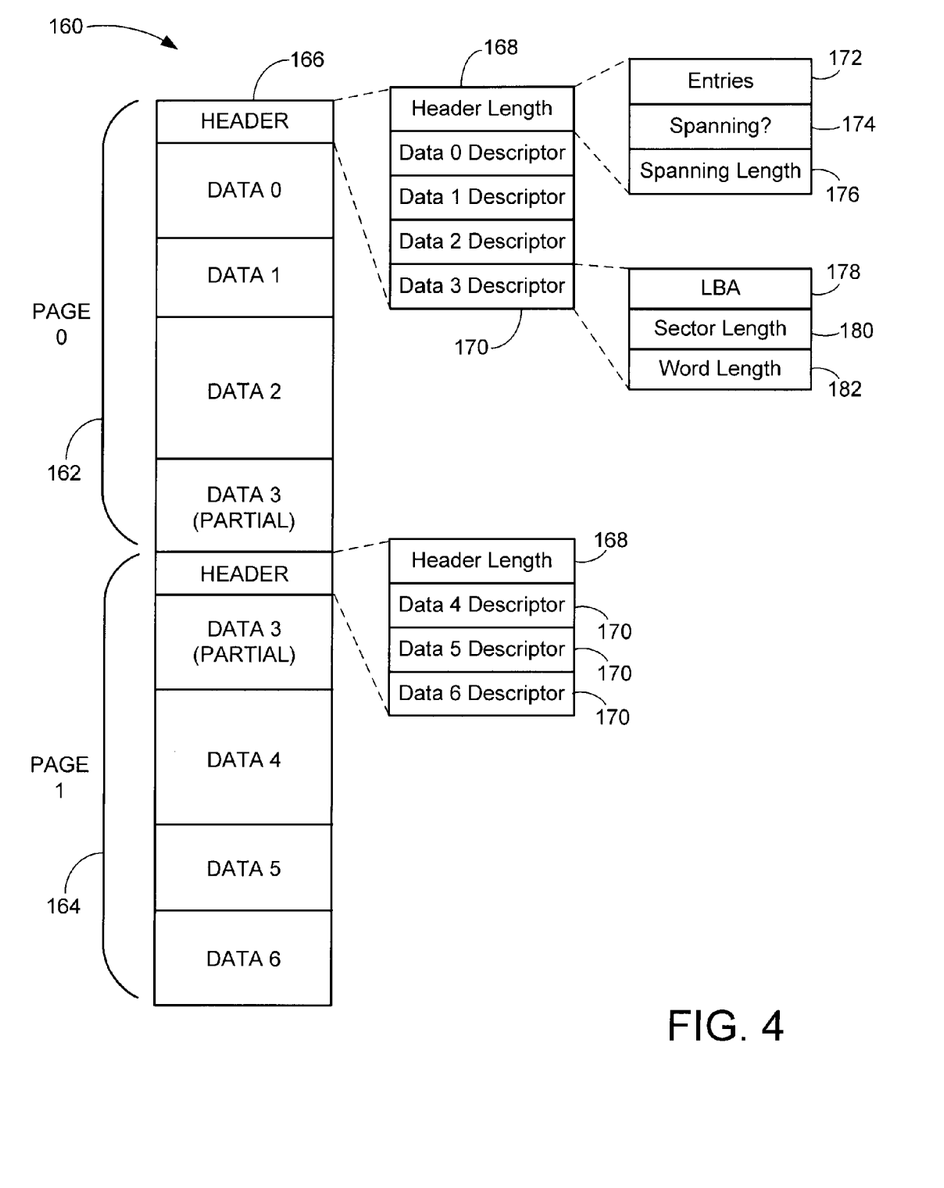
FIG. 4 shows an exemplary format for page descriptor data in accordance with various embodiments.

Page level descriptor data are exemplified in FIG. 4. In at least some embodiments, the page descriptor data are appended to every physical page in the array, and serve to describe every LBA stored to that page. As shown in FIG. 4, a memory space 160 includes first and second pages 162, 164 (Page 0 and Page 1). Bits are allocated at the beginning of each page to establish a page header region 166. Each page header region 166 stores the page descriptor data for that page in a variety of fields including a header length descriptor 168 and a number of data descriptor fields 170.

The header length descriptor 168 identifies the total number of entries (e.g., LBAs) stored to the associated page in an entries field 172. A spanning field 174 indicates whether the last LBA spans the page boundary to the next page, as represented for DATA 3 in FIG. 4. A spanning length field 176 indicates the total number of spanned bits for the partial LBA (e.g., how many bits of the spanned LBA appear in the following page). In some embodiments, the entries field 172 uses seven (7) bits, the spanning field 174 uses one (1) bit, and the length field 176 uses ten (10) bits, for a total length of 18 bits.

Each of the individual data descriptor fields 170 are associated with an individual LBA stored to the associated page. While formats can vary, the exemplary format in FIG. 4 includes an LBA identifier field 178 (32 bits), a sector length field 180 (3 bits) and a word length field 182 (10 bits) for a total of 45 bits. With reference to the second half of the spanned LBA 3 in FIG. 4, no duplicate entry is necessarily required in the header for the second page 164 since the information relating to this LBA is fully represented in the entry for this LBA in the first page 162.

It is contemplated that write data will be accumulated and written a page at a time, so that the page descriptor data can be generated and written during the writing of the associated LBAs. If less than a complete page of data is written, filler bits can be appended to fill the page, and the next write operation will commence with the next available page in the GCU.

The page header fields 166 (FIG. 4) provide information on every LBA at the page level, and the GCU header fields 150 (FIG. 3) provide information with regard to the order in which the GCUs were written. If two or more versions of the same LBA are present in a GCU, a version of the LBA at a higher (later in time) page address of the GCU supersedes the version of the LBA at a lower (earlier in time) page address. Thus, these elements can be combined to verify any sequence of forward pointers in the metadata, as well as to reconstruct any or all of the metadata in the system.

Figure 5:
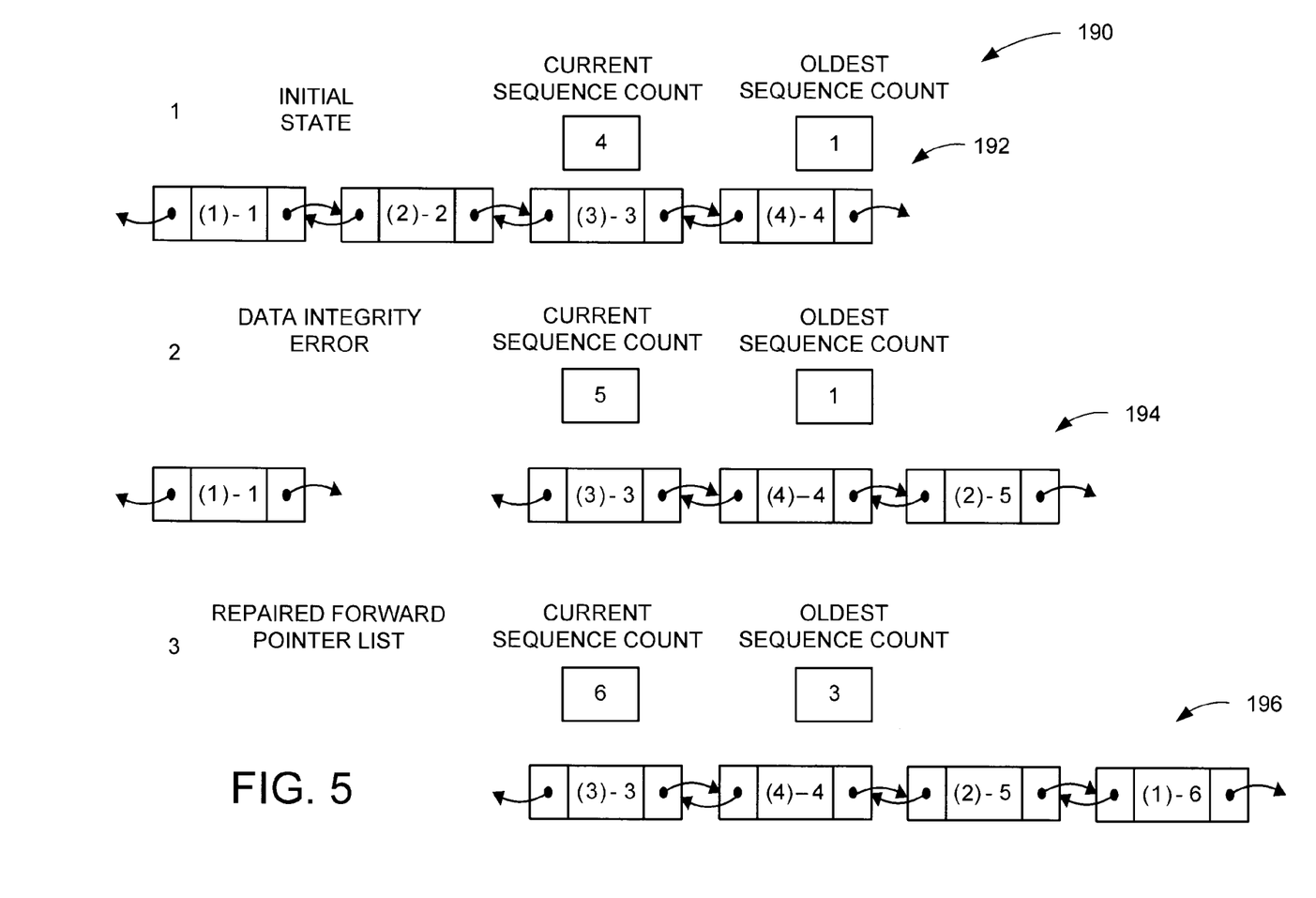
FIG. 5 illustrates a number of exemplary GCU sequence states that may arise over time.

To illustrate this operation, an exemplary sequence structure 190 is shown in FIG. 5. An initial state 1 is denoted at 192. In this initial state, a total of four GCUs have been allocated, denoted as GCUs 1, 2, 3 and 4. For reference, GCU identifiers are shown in parentheses, followed by a number indicating relative order of allocation. Since the GCUs in state 1 were allocated in order, these respective numbers happen to match.

This provides a continuous, unbroken chain of all GCUs in the system, with GCU 1 being the oldest in the chain and GCU 4 being the most recently allocated GCU in the chain. The forward pointers of the metadata can be verified by reference to the GCU and page descriptor data, which should nominally be present for all of the GCUs in the chain.

A subsequent state 2 of the system is denoted at 194. In this state, all of the data in GCU 2 were previously determined to be stale, and so GCU 2 was erased and has now been allocated as the fifth GCU in the sequence. The current GCU is GCU 2, and the oldest active GCU remains GCU 1. The chain of GCUs is broken by the hole provided by the erasure and reallocation of GCU 2, and metadata pointers previously stored in GCU 2 have been lost.

A subsequent state 3 is denoted at 196. In this state, all of the data in GCU 1 were previously determined to be stale, so GCU 1 was erased and reallocated as the sixth GCU in the sequence. GCU 1 is now the current GCU and GCU (3) is the oldest GCU. This provides a continuous chain but all metadata previously stored in GCUs (1) and (2) are now lost.

Figure 6:
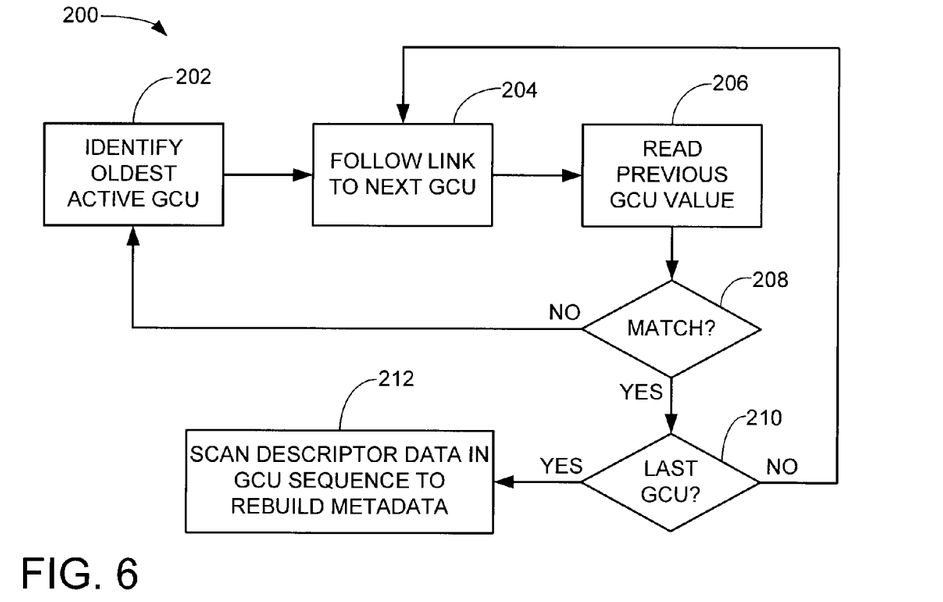
FIG. 6 provides logic for identifying an existing GCU sequence during a metadata rebuild operation.

FIG. 6 shows exemplary rebuild logic 200 that can be used to perform a rebuild of missing metadata such as represented in FIG. 5. The logic 200 can comprise programming steps stored in a memory location accessible by the system controller. Alternatively, the logic 200 can be realized in specially configured hardware. As explained below, the logic operates to characterize the sequence order of the active GCUs, including identification of any holes in the sequence. Once the sequence is known, a systematic evaluation of the page descriptor data is carried out in this GCU sequence to reconstruct the metadata. Various registers may be used to store count values and other information during the search.

The logic 200 begins in FIG. 6 at step 202 with a search for the oldest active GCU. This can be carried out by examining the serial number value of the GCU header field 152 in each GCU. The GCU with the oldest date is identified. This oldest active GCU is identified as the first GCU in the sequence. At step 204, the next GCU field 156 of the first GCU is read to identify the address of a second GCU that was allocated immediately after the first GCU. At step 206, the previous GCU field 154 of the second GCU is read.

A comparison is made at step 208 to determine if the previous GCU field 154 of the second GCU identifies the address of the first GCU. If so, a continuous sequence is detected as in state 1 of FIG. 5 between GCUs (1) and (2). If not, a hole in the sequence is detected as in state 2 of FIG. 5.

If a hole is detected, the logic returns to step 202 and the next oldest GCU is identified, such as GCU (3) in state 2 of FIG. 5. This next oldest GCU is characterized as the new first GCU in the sequence, and the process continues as discussed above. If no hole is detected, a determination is made at decision step 210 as to whether all of the active GCUs have been accounted for in the sequence.

If not, the logic 250 passes back to step 204 and the links continue to be followed as before. If the end of the chain has been identified, the logic passes from step 210 to step 212 where, for each GCU in the sequence in turn, the page descriptor data is read and the metadata is reconstructed.

As long as the GCUs are followed in the identified sequence, the system will essentially replay all of the write sequences for each LBA in chronological order. By the time all of the GCUs have been traversed, an accurate and up-to-date metadata table will have been generated. As desired, data can be transferred to new available GCUs during this operation to better arrange the data and metadata. Defective blocks and/or GCUs can be deallocated as required during this process as well.

One way in which this forward replaying of write sequences can be made is by reading the page descriptor data out in order, maintaining a record of each LBA, and generating the associated metadata based on the location information from the page descriptor data. The columnar alignment of the LBA data fields will facilitate this data retrieval.

Figure 7:
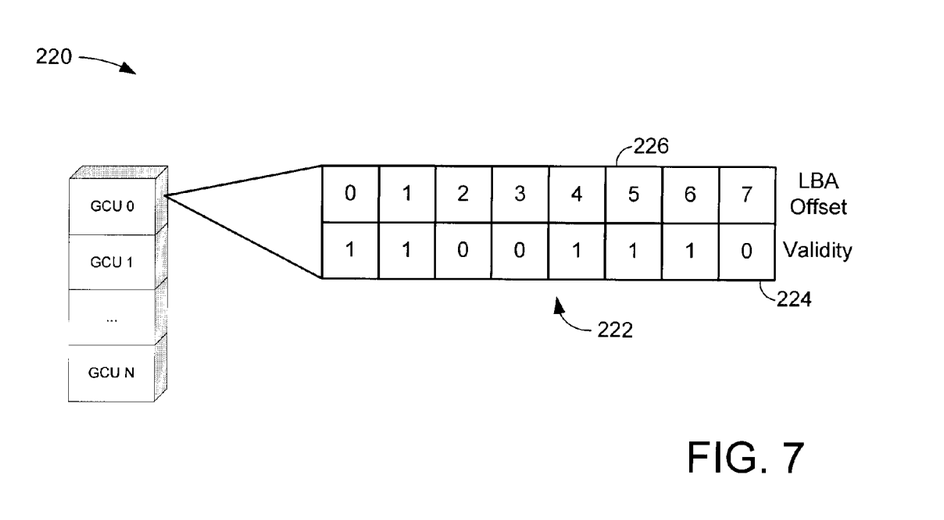
FIG. 7 shows a bitmask as a portion of the descriptor data in accordance with some embodiments.

While the foregoing embodiments facilitate on-the-fly verification and partial or complete metadata rebuild operations, further embodiments provide additional descriptor data in the form of bitmask data used to denote the write status of each LBA. FIG. 7 generally illustrates an exemplary bitmask module 220. The module utilizes a bitmask 222 maintained in a suitable location, such as in the GCU or page descriptor data or elsewhere in volatile or non-volatile memory, that marks each associated LBA as either a current version of the data, or as a stale version of the data.

When an LBA is written to a particular physical location, a validity bit 224 can be set to an appropriate value such as logical 1, indicating that the LBA at this PBA is the most current version. At the same time, the previous physical location that contains a stale version of the LBA has a corresponding validity bit set to zero to indicate that LBA version is now out of date.

A variety of bit indicators can be used including multi-bit indicators. For example, the bit value "10" can be used to denote a current LBA and "00" can be used to indicate a stale LBA. In some memories such as Flash, writes may only be performed in a single direction (e.g., from a 1 to a 0), and require an erasure to reset the value (from 0 back to 1). Thus, if the bitmask is maintained and updated in non-volatile memory, the setting of a particular bit in the bitmask to indicate a current LBA status may not necessarily require an actual write event to change the state of an associated memory cell.

During a read request for a selected LBA, the forward pointer(s) of the metadata can be followed in an effort to identify the physical location (PBA) of the most current version of the LBA. The physical address can be used as the look-up address to form an LBA offset value 226 that can then either be stored in a table, or will be determined from the descriptor data. If the validity bit for the requested LBA offset if programmed to zero, an error is detected and can be reported to the host.

As a result, the bitmask be used to determine if the metadata properly provides the most current location of the LBA because only the most recent copy will have the validity bit set to one (or whatever other value is used to identify current data). As such, the bitmask can provide further verification confidence due to the fact that out of all of the PBAs that store different versions of the same LBA, only a single PBA will have a current validity bit as directed by the descriptor data.

It can be appreciated that the marking of an LBA can refer to either a single LBA or a group of LBAs to form a large logical data group. Such larger data groups can be used to effectively minimize the size of a bitmask table. The bitmask can also be used as further verification that all of the data in a selected GCU are stale, so that the GCU can be safely erased and reallocated.

Figure 8:
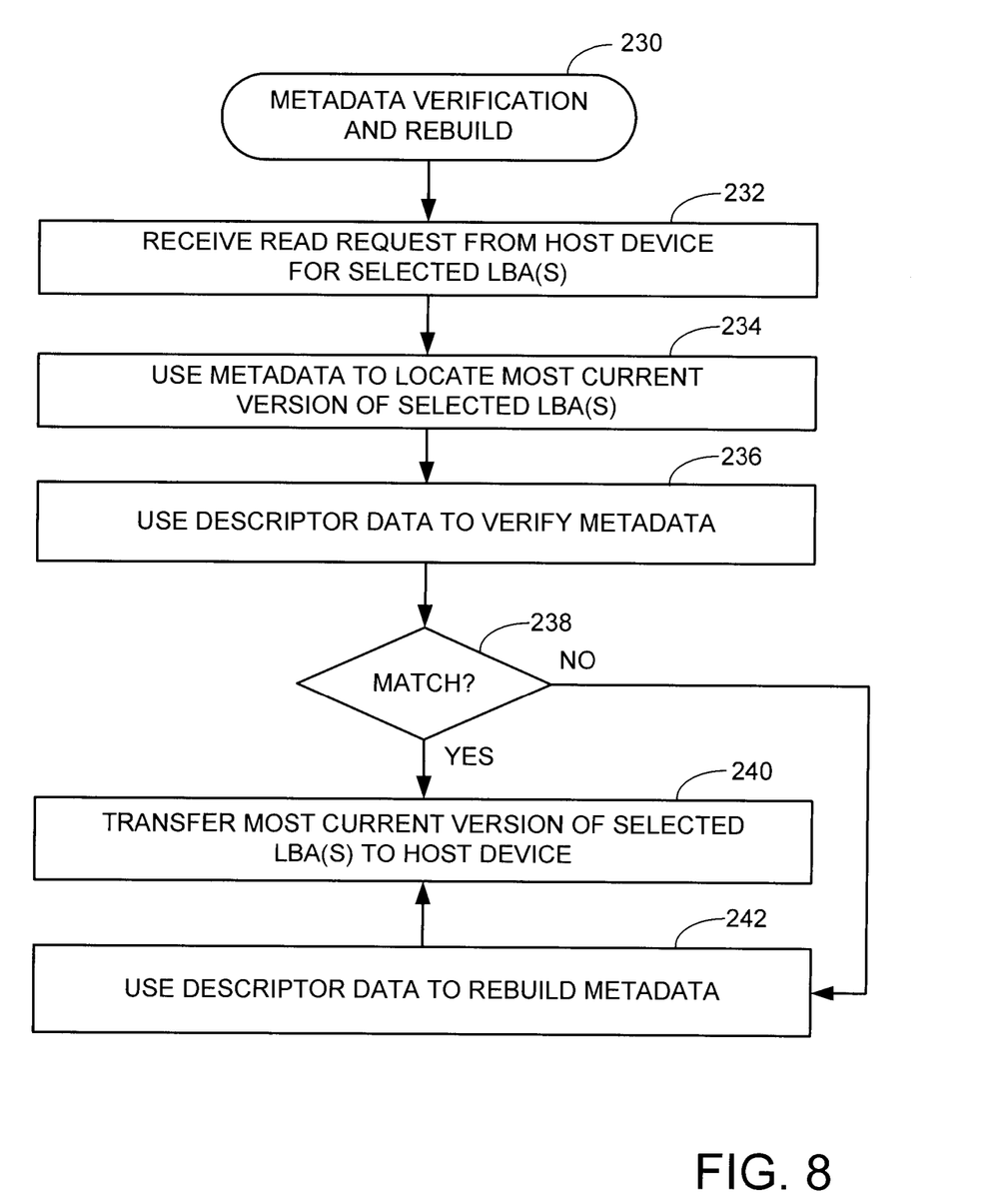
FIG. 8 provides a flow chart for an exemplary routine generally illustrative of steps carried out in accordance with various embodiments of the present invention.

FIG. 8 provides an exemplary metadata verification routine 230 to illustrate various steps carried out in accordance with the foregoing discussion. In a system such as 100, a read request for one or more selected LBAs is received at step 232. Metadata such as stored in metadata regions 138 is accessed to locate a PBA for the most current version of the requested data, step 234.

At step 236, the system concurrently accesses the descriptor data to separately identify the physical location of the most current version of the requested data. This can be carried out in a number of ways, such as by scanning the page descriptor data for the LBAs in an order determined by the GCU descriptor data.

A determination is made at decision step 238 whether the physical location identified by the metadata for the most current version of data matches the physical location identified by the descriptor data. If so, the data are transferred to the host from this location at step 240. If not, a metadata rebuild operation takes place as discussed in FIGS. 5-7 at step 242, and the data are returned at step 240.

While it should be noted that the rebuild routine can terminate after the replacement of all metadata errors, the routine can also evaluate the metadata after the rebuilding step. Such evaluation can occur sequentially after the metadata is rebuilt, but is not limited to placement before a host can access the metadata. That is, the evaluation of the rebuilt metadata can be delayed or scheduled to occur as various LBAs other than the particular LBA are read from the various GCUs.

As such, the descriptor data stored in each page of a memory space can be read and updated during host accesses to the various pages and provide real-time verification and failure analysis of metadata corresponding to the data. With the reading and writing of the descriptor data with each host read and write operation on a page, the pointers can be continuously updated and evaluated against the metadata to ensure the detection of errors. In the event of such an error, the descriptor data can be used to rebuild the metadata to ensure the most recent version of a particular LBA is provided upon request.

It will be appreciated that the various embodiments discussed herein have numerous potential applications and are not limited to a certain field of electronic media or type of data storage devices. For purposes herein, the references to rows and columns will be read broadly as relational identifiers in an ordered array of elements along different axes without constituting a specific physical layout. Thus for example, the term "row" may constitute a physical column without deterring from the spirit of the present invention.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising:
   a data storage space comprising a plurality of garbage collection units (GCUs) each arranged in logical units that store user data identified by associated logical addresses, metadata that correlates the logical addresses and physical addresses, and descriptor data that identifies at least the position and size of each logical unit in the GCU; and
   a control circuit which uses the descriptor data to rebuild the metadata to correctly indicate a physical address of a most current version of the user data associated with a selected logical address.

2. The apparatus of claim 1, wherein responsive to a read request for the most current version of data identified by the selected logical address, the control circuit follows a sequence of pointers from a first selected physical address and uses the descriptor data to identify a second selected physical address.

3. The apparatus of claim 2, wherein the control circuit identifies a sequence at which the plurality of GCUs were allocated to store said user data and uses this sequence to rebuild the metadata and return correct data to a host.

4. The apparatus of claim 1, wherein the descriptor data comprises GCU level descriptor data comprising a sequence number indicating when the associated GCU was allocated for service relative to the remaining GCUs of said plurality.

5. The apparatus of claim 1, wherein the descriptor data comprises a previous GCU value which identifies a physical address of the GCU that was allocated for service immediately prior to the associated GCU, and a next GCU value which identifies a physical address of the GCU that was allocated for service immediately after the associated GCU.

6. The apparatus of claim 4, wherein the descriptor data further comprises page level descriptor data comprising data appended to each page in each GCU, the page level descriptor identifying the logical addresses of the user data stored to each said page.

7. The apparatus of claim 1, wherein the metadata are stored in a metadata region of each GCU.

8. The apparatus of claim 7, wherein the metadata are rebuilt by replacing portions of the metadata with portions of the descriptor data.

9. The apparatus of claim 7 wherein the metadata are rebuilt by replacing portions of the metadata with portions of the descriptor data.

10. The apparatus of claim 1, wherein each GCU comprises one or more erasure blocks, each erasure block comprising a plurality of pages, each page adapted to store at least a portion of the descriptor data and at least a portion of the user data in the GCU.

11. The apparatus of claim 1, wherein the control circuit rebuilds the metadata by using the descriptor data to identify an oldest active GCU among said plurality of GCUs, and to follow forward and backward pointers in the descriptor data to identify a sequence in which the GCUs were successively allocated for service.

12. The apparatus of claim 1, wherein the descriptor data comprises a bitmask of bits that respectively represent each copy of user data stored in the data storage space.

13. The apparatus of claim 12, wherein a first logical value in the bitmask indicates a most current version of data having a selected logical address and a different, second logical value in the bitmask indicates a stale version of data having the selected logical address.

14. A method comprising:
arranging a data storage space as a plurality of garbage collection units (GCUs) each adapted to store user data in logical units identified by logical addresses that are uniquely identified by physical addresses, metadata that correlates the logical addresses and physical addresses, and descriptor data that identifies at least the position and size of each logical unit in the GCU; and
using the descriptor data to rebuild the metadata to indicate a storage location of a most current version of a selected logical address.

15. The method of claim 14, wherein the descriptor data is stored in a header region of each corresponding GCU.

16. The method of claim 14, wherein the data storage space comprises erasable non-volatile memory cells, and each GCU comprises at least one erasure block of said memory cells that are concurrently erased during an erasure operation to set all of the memory cells to a common logical state.

17. The method of claim 14, further comprising receiving a request for the most current version of the selected logical address, following a sequence of pointers from said metadata to identify a first selected physical address, using the descriptor data to identify a second selected physical address, and identifying said error in the metadata when the first selected physical address is different than the second selected physical address.

18. The method of claim 17, further comprising determining a sequence in which the plurality of GCUs were allocated to store said user data responsive to identification of said error in the metadata, and using the determined sequence of GCU allocation to rebuild the metadata.

19. The method of claim 14, wherein the descriptor data comprise GCU level descriptor data comprising a sequence number indicating when the associated GCU was allocated for service relative to the remaining GCUs of said plurality, a previous GCU value which identifies a physical address of the GCU that was allocated for service immediately prior to the associated GCU, and a next GCU value which identifies a physical address of the GCU that was allocated for service immediately after the associated GCU.

20. The method of claim 14, wherein the descriptor data further comprises page level descriptor data comprising data appended to each page in each GCU, the page level descriptor identifying the logical addresses of the user data stored to each said page.

21. The method of claim 14, wherein metadata are rebuilt by using the descriptor data to identify an oldest active GCU among said plurality of GCUs, and following forward and backward pointers in the descriptor data to identify a sequence in which the GCUs were successively allocated for service.

22. The method of claim 14, further comprising using a bitmask of bits that respectively represent each copy of user data stored in the memory space to identify said error in the metadata, wherein a first logical value in the bitmask indicates a most current version of data having a selected LBA and a different, second logical value in the bitmask indicates a stale version of data having the selected LBA.

23. An apparatus comprising:
a data storage space comprising a plurality of garbage collection units (GCUs) each arranged in logical units that store user data identified by associated logical addresses, metadata that correlates the logical addresses and physical addresses, and descriptor data which lists at least the position and size of each logical unit in the GCU; and
a control circuit which uses portions of the descriptor data including at least a sequence number that is unique to each GCU, a forward GCU pointer, and a reverse GCU pointer to rebuild the metadata to correctly indicate a physical address of a most current version of the user data associated with a selected logical address.

* * * * *